United States Patent
Lee et al.

(10) Patent No.: US 6,791,653 B2
(45) Date of Patent: Sep. 14, 2004

(54) IN-PLANE SWITCHING MODE LIQUID CRYSTAL DISPLAY

(75) Inventors: Joun Ho Lee, Taegu-shi (KR); Jeong Ki Park, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 204 days.

(21) Appl. No.: 09/736,335

(22) Filed: Dec. 15, 2000

(65) Prior Publication Data

US 2001/0046019 A1 Nov. 29, 2001

(30) Foreign Application Priority Data

Dec. 15, 1999 (KR) ........................................ 1999-57779

(51) Int. Cl.[7] .......................................... G02F 1/1343
(52) U.S. Cl. ..................................................... 349/147
(58) Field of Search ........................................ 349/141

(56) References Cited

U.S. PATENT DOCUMENTS

| | | | |
|---|---|---|---|
| 4,239,346 A | 12/1980 | Lloyd | 350/334 |
| 4,726,659 A | 2/1988 | Conrad et al. | 350/341 |
| 5,307,189 A | 4/1994 | Nishiki et al. | 359/59 |
| 5,321,535 A | 6/1994 | Ukai et al. | 359/55 |
| 5,459,596 A | 10/1995 | Ueda et al. | 359/59 |
| 5,464,669 A | 11/1995 | Kang et al. | 428/1 |

(List continued on next page.)

FOREIGN PATENT DOCUMENTS

| | | |
|---|---|---|
| EP | 0 368 260 | 5/1990 |
| EP | 0 588 568 | 3/1994 |
| EP | 0 749 029 | 12/1996 |
| JP | 60-158421 | 8/1985 |
| JP | 62-078532 | 4/1987 |
| JP | 04-067127 | 3/1992 |

(List continued on next page.)

OTHER PUBLICATIONS

U.S. patent application Ser. No. 09/365,634, Hiroshi, filed Aug. 1999.
U.S. patent application Ser. No. 08/880,068, Hiroshi, filed Jun. 1997.
U.S. patent application Ser. No. 09/143,624, Shin et al., filed Aug. 1998.
U.S. patent application Ser. No. 09/079,894, Seo, filed May 1998, abandoned.
U.S. patent application Ser. No. 09/613,730, Hiroshi, filed Jul. 2000.
U.S. patent application Ser. No. 09/079,895, Oh, filed May 1998.
U.S. patent application Ser. No. 09/348,704, Lee et al., filed Jul. 1999.
U.S. patent application Ser. No. 09/134,405, Han, filed Aug. 1999.
U.S. patent application Ser. No. 09/149,746, Seo, filed Sep. 1999.
U.S. patent application Ser. No. 09/235,205, Seo et al., filed Jan. 1999.
U.S. patent application Ser. No. 09/271,153, Son et al., filed Mar. 1999.

(List continued on next page.)

Primary Examiner—Robert H. Kim
Assistant Examiner—P. R. Akkapedi
(74) Attorney, Agent, or Firm—McKenna Long & Aldridge LLP

(57) ABSTRACT

An in-plane switching mode liquid crystal display includes a first substrate and a second substrate, a first electrode on the first substrate, a gate insulating film on an entire surface of the first substrate, a second electrode on the gate insulating film for forming an in-plane electric field, together with the first electrode, a protection film on the first electrode and the second electrode, an asymmetric transparent electrode on the protection film, and a liquid crystal layer between the first substrate and the second substrate, thereby shielding against signal distortion caused by Cr black matrix, reducing vertical crosstalk and reducing the driving voltage.

53 Claims, 4 Drawing Sheets

U.S. PATENT DOCUMENTS

| | | | |
|---|---|---|---|
| 5,492,762 A | 2/1996 | Hirai et al. | 428/447 |
| 5,576,858 A | 11/1996 | Ukai et al. | 359/59 |
| 5,598,285 A | 1/1997 | Kondo et al. | 349/39 |
| 5,600,464 A | 2/1997 | Ohe et al. | 349/123 |
| 5,602,662 A | 2/1997 | Rosenblatt et al. | 349/130 |
| 5,608,556 A | 3/1997 | Koma | 349/143 |
| 5,646,705 A | 7/1997 | Higuchi et al. | 349/143 |
| 5,686,019 A | 11/1997 | Nakamura | 252/299.01 |
| 5,737,051 A | 4/1998 | Kondo et al. | 349/141 |
| 5,742,369 A | 4/1998 | Mihara et al. | 349/123 |
| 5,745,207 A | 4/1998 | Asada et al. | 349/141 |
| 5,757,455 A | 5/1998 | Sugiyama et al. | 349/129 |
| 5,760,856 A | 6/1998 | Yanagawa et al. | 349/42 |
| 5,760,857 A | 6/1998 | Yanagawa et al. | 349/43 |
| 5,786,876 A | 7/1998 | Ota et al. | 349/42 |
| 5,793,459 A | 8/1998 | Toko | 349/128 |
| 5,831,701 A | 11/1998 | Matsuyama et al. | 349/110 |
| 5,841,499 A | 11/1998 | Baur et al. | 349/141 |
| 5,852,485 A | 12/1998 | Shimada et al. | 349/141 |
| 5,859,682 A | 1/1999 | Kim et al. | 349/124 |
| 5,870,160 A | 2/1999 | Yanagawa et al. | 349/141 |
| 5,886,762 A | 3/1999 | Lee et al. | 349/141 |
| 5,907,379 A * | 5/1999 | Kim et al. | 349/141 |
| 5,907,380 A | 5/1999 | Lien | 349/141 |
| 5,910,271 A | 6/1999 | Ohe et al. | 252/299.01 |
| 5,914,762 A | 6/1999 | Lee et al. | 349/141 |
| 5,946,067 A | 8/1999 | Kim et al. | 349/141 |
| 5,956,111 A | 9/1999 | Ohta et al. | 349/141 |
| 5,959,708 A | 9/1999 | Lee et al. | 349/143 |
| 5,969,782 A | 10/1999 | Lee et al. | 349/141 |
| 5,977,562 A | 11/1999 | Hirakata et al. | 257/72 |
| 5,995,186 A | 11/1999 | Hiroshi | 349/141 |
| 6,005,650 A | 12/1999 | Kim et al. | 349/130 |
| 6,040,887 A | 3/2000 | Matsuyama et al. | 349/141 |
| 6,404,473 B1 * | 6/2002 | Kaneko et al. | 349/139 |
| 6,466,289 B1 * | 10/2002 | Lee et al. | 349/141 |

FOREIGN PATENT DOCUMENTS

| | | |
|---|---|---|
| JP | 06-160878 | 6/1994 |
| JP | 06-273803 | 9/1994 |
| JP | 07-036058 | 2/1995 |
| JP | 07-134301 | 5/1995 |
| JP | 07-225388 | 8/1995 |
| JP | 08-062586 | 3/1996 |
| JP | 09-005763 | 1/1997 |
| JP | 09-005764 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| JP | 10-319436 | 12/1998 |
| KR | 96-32049 | 9/1996 |
| KR | 97-22458 | 5/1997 |
| KR | 98-040330 | 8/1998 |
| KR | 98-083765 | 12/1998 |
| WO | 97-10530 | 3/1997 |

OTHER PUBLICATIONS

S. Matsumoto, Display Characteristics of In–Plane Switching (IPS) LCDs and a Wide–Viewing–Angle 14.5–in. IPS TFT–LCD; Euro Display '96, pp. 445–448.

H. Wakemoto, "An Advanced In–Plane–Switching Mode", TFT–LCD, 1997 SID Digest, pp. 929–932.

M–Oh–e, "Priciples and Characteristics of Electro–Optical Behaviour with In–Plane Switching Mode", Asia Display '95, pp. 577–580.

M. Ohta, "Development of Super–TFT–LCDs With In–Plane Switching Display Mode", 1995, Asia Display '95, pp. 707–710.

S. H. Lee, "High–Transmittance, Wide–Viewing–Angle Nematic Liquid Crystal Display Controlled by Fringe–Field Switching", Asia Display '98, pp. 371–374.

R. Kiefer, "In–Plane Switching of Nematic Liquid Crystals", Japan Display '92, pp. 547–550.

* cited by examiner

IN-PLANE SWITCHING MODE LIQUID CRYSTAL DISPLAY

This application claims the benefit of Korean Patent Application No. 1999-57779, filed on Dec. 15, 1999, which is hereby incorporated by reference for all purposes as if fully set forth herein.

BACKGROUND OF THE INVENTION

1. Field of the Invention

The present invention relates to a liquid crystal display, and more particularly, to an in-plane switching mode liquid crystal display.

2. Discussion of the Related Art

Although demands for large-sized thin film transistor liquid crystal displays (TFT-LCDs) for use in portable TV receivers or notebook computers are great, such large-sized TFT-LCDs have a problem in that contrast ratio varies with viewing angle. For solving such problem, a variety of LCDs, such as twisted nematic (TN) LCDs and multi-domain LCDs have been suggested as having high picture quality and low power consumption. Each of these suggested LCDs have a phase compensation film fitted thereto. However, LCDs cannot solve the problem of viewing angle because liquid crystal molecules that are oriented horizontal to a substrate is oriented almost vertical to the substrate when a voltage is provided to a liquid crystal panel. Accordingly, an in-plane switching mode LCD has been suggested for implementing wide viewing angle, in which the liquid molecules are oriented in a direction almost horizontal to the substrate.

FIG. 1 illustrates an in-plane switching mode LCD in the related art.

As shown in FIG. 1, a conventional in-plane switching LCD includes a first substrate having gate lines 1 and data lines 2 running in horizontal and vertical directions. The gate lines 1 and the data lines 2 define a plurality of pixel regions, of which only one is shown in the drawing for convenience of description. In the pixel region, there is a common line 3 in parallel with the gate line 1, and a thin film transistor at a crossing point of the gate line 1 and the data line 2. As shown in FIG. 2, the TFT includes a gate electrode 4, a gate insulating film 12, a source electrode 6, a drain electrode 7, a semiconductor layer 5, and an ohmic contact layer 11. The gate electrode 4 and the source/drain electrodes 6 and 7 are connected to the gate line 1 and the data line 2, respectively. The gate insulating film 12 is formed on an entire surface of a first substrate 10. In the pixel region, there is a common electrode 8 and a data electrode 9 formed parallel to each other for providing an in-plane electric field. The common electrode 8 is formed on the first substrate 10 at the same time as the gate electrode 4 and is connected to the common line 3. The data electrode 9 is formed on the gate insulating film 12 at the same time as the source/drain electrodes 6 and 7 and is connected to the source/drain electrodes 6 and 7 of the TFT. A protection film 13 and a first orientation film 14 cover the common electrode 8 and the data electrode 9 over the first substrate 10. A second substrate 15 is provided with a black matrix 16 including chrome for preventing leakage of light to the TFTs, gate lines 1 and data lines 2, and a color filter layer 17. Although not shown in the drawing, an overcoat layer for eliminating an uneven surface of the black matrix is formed on the color filter layer and a second orientation film 18 is coated over the color filter layer 17. A liquid crystal layer 20 is formed between the first and second substrates 10 and 15.

When there is no voltage provided to the foregoing LCD, the liquid crystal molecules in the liquid crystal layer 20 are oriented along a direction of orientation of the first orientation film 14 and the second orientation film 18. When a voltage is provided between the common electrode 8 and the data electrode 9, the liquid crystal molecules are switched to be parallel with the substrate and oriented in a direction perpendicular to a longitudinal direction of the common electrode 8 and the data electrode 9. As described, since the liquid crystal molecules in the liquid crystal layer 20 are always switched in the same plane, there is no gray level inversion for viewing at angles of up, down, left and right directions.

However, referring to FIG. 3, which shows an electric field applied to the liquid crystal layer, the foregoing in-plane switching mode LCD has the following problems.

First, because there is the protection film 13 on the data electrode 9 and the gate insulating film 12 and the protection film 13 on the common electrode 8, the in-plane electric field applied to the liquid crystal layer 20 is absorbed by the gate insulating film 12 and the protection film 13, weakening the power of the in-plane electric field and thus reducing the switching speed of the liquid crystal molecules, i.e., a response time of the liquid crystal molecules. Thus, discontinuity disconnection may occur in a moving image displayed by the in-plane LCD.

Second, chrome in the black matrix 16 causes a distortion in an electric field produced by a data signal on the data line 2. As shown in drawings, the electric field of the data signal directly applies to the data electrode 9. Namely, the electric field produced by the data signal is affected in the first window between the common electrode 8 and the data electrode 9. This distorted electric field affects the orientation of the liquid crystal in the first window causing a change in the transmissivity of the liquid crystal at the ends of the window, resulting in a vertical crosstalk.

Third, a wider common electrode 8 may moderate a drop in the shielding effect caused by the position of the common electrode 8 under the gate insulating film 12 and the protection film 13. However, the wider common electrode reduces the aperture ratio with a consequential drop in luminance.

SUMMARY OF THE INVENTION

Accordingly, the present invention is directed to an in-plane switching mode liquid crystal display that substantially obviates one or more of the problems due to limitations and disadvantages of the related art.

An advantage of the present invention is to provide an in-plane switching mode liquid crystal display that can shield against signal distortion caused by a Cr (chrome) black matrix.

Another advantage of the present invention is to provide an in-plane switching mode liquid crystal display that can reduce vertical crosstalk and allow a low driving voltage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode LCD includes a first substrate having a switching element, a second substrate, a first electrode and a second electrode on the first substrate, a transparent electrode asymmetrically overlapping the first electrode, and a liquid crystal layer between the first substrate and the second substrate.

In another aspect of the present invention, an in-plane switching liquid crystal display (LCD) device comprises a first substrate; a second substrate; a thin film transistor including: a gate electrode on the first substrate, a gate insulating layer on the gate electrode, a semiconductor layer on the gate insulating layer, and a source electrode and a drain electrode on the semiconductor layer; a gate line connected to the gate electrode extending in a first direction; a data line connected to one of the source and drain electrodes extending in a second direction, the gate line and the data line defining a pixel region; a common electrode on the first substrate on the same layer as the gate line and gate electrode and spaced from the gate electrode; a data electrode connected to one of the source and drain electrodes on the gate insulating film and spaced from the common electrode; a protection film on the thin film transistor; a field distorting electrode on the protection film overlapping at least a portion of the common electrode, the field distorting electrode preventing vertical crosstalk caused by the data line and the data electrode; a black matrix on the second substrate; a liquid crystal material between the first and second orientation films.

In another aspect of the present invention, A method of manufacturing an in-plane switching liquid crystal display (LCD) device comprises forming a thin film transistor including: forming a gate electrode on a first substrate, forming a gate insulating layer on the gate electrode, forming a semiconductor layer on the gate insulating layer, and forming a source electrode and a drain electrode on the semiconductor layer; forming a gate line connected to the gate electrode extending in a first direction; forming a data line connected to one of the source and drain electrodes extending in a second direction, the gate line and the data line defining a pixel region; forming a common electrode on the first substrate on the same layer as the gate line and gate electrode and spaced from the gate electrode; forming a data electrode connected to one of the source and drain electrodes on the gate insulating film and spaced from the common electrode; forming a protection film on the thin film transistor, the common electrode and the data electrode; forming a field distorting electrode on the protection film overlapping at least a portion of the common electrode, the field distorting electrode preventing vertical crosstalk caused by the data line and the data electrode; and forming a first orientation film on the protection film and the field-distorting electrode.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
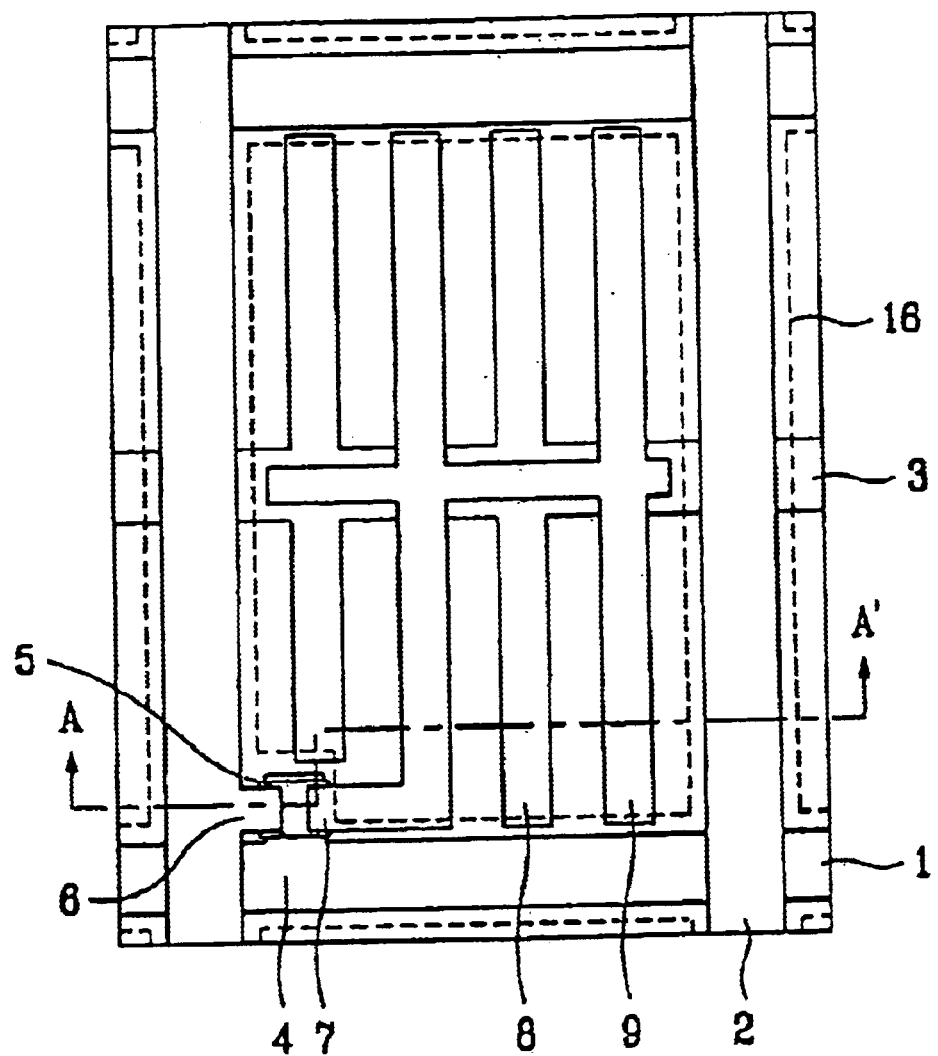
FIG. 1 illustrates a plan view showing a related art in-plane switching mode LCD.
Figure 2:
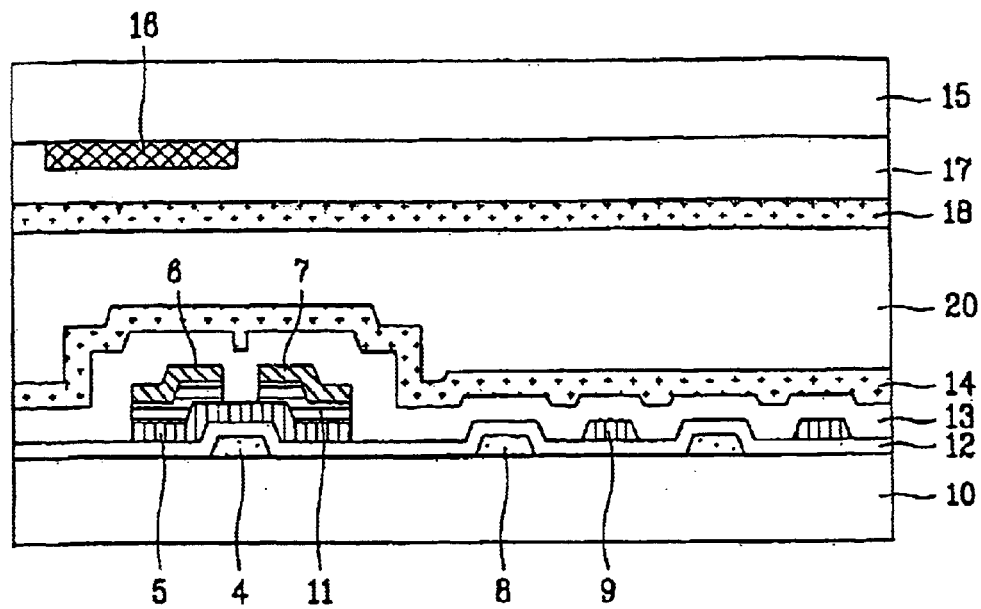
FIG. 2 illustrates a section across A–A' in FIG. 1.
Figure 3:
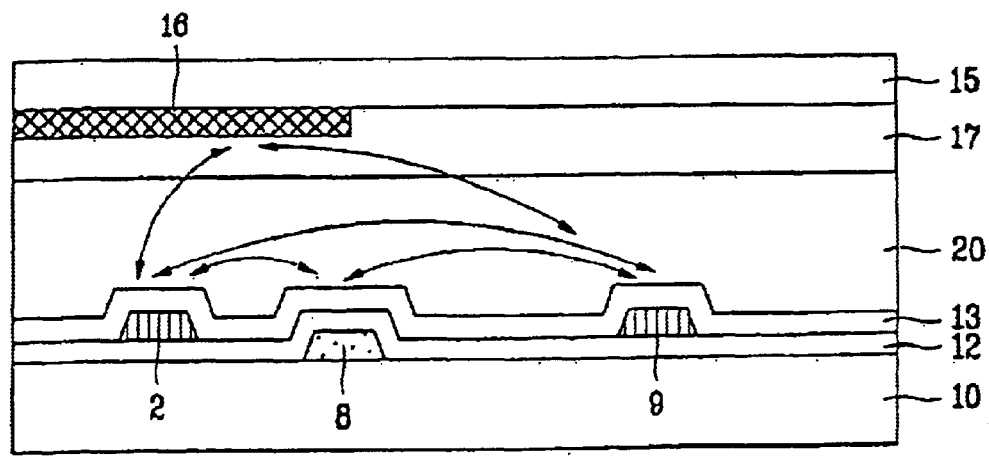
FIG. 3 illustrates electric fields produced in a section of a related art in-plane switching mode LCD.
Figure 4:
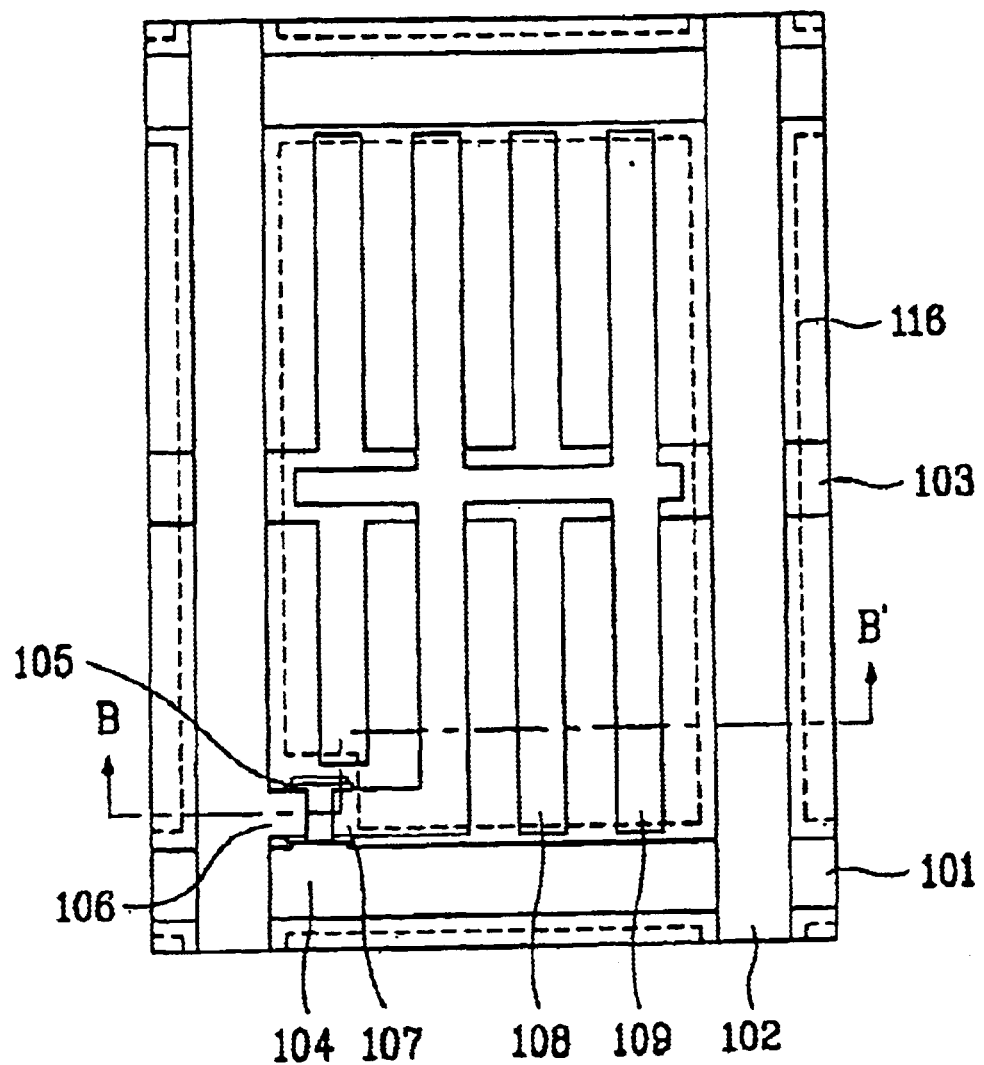
FIG. 4 illustrates a plan view showing an in-plane switching mode LCD in accordance with a preferred embodiment of the present invention.

FIG. 4 illustrates a plan view showing an in-plane switching mode LCD in accordance with a preferred embodiment of the present invention.

Figure 5:
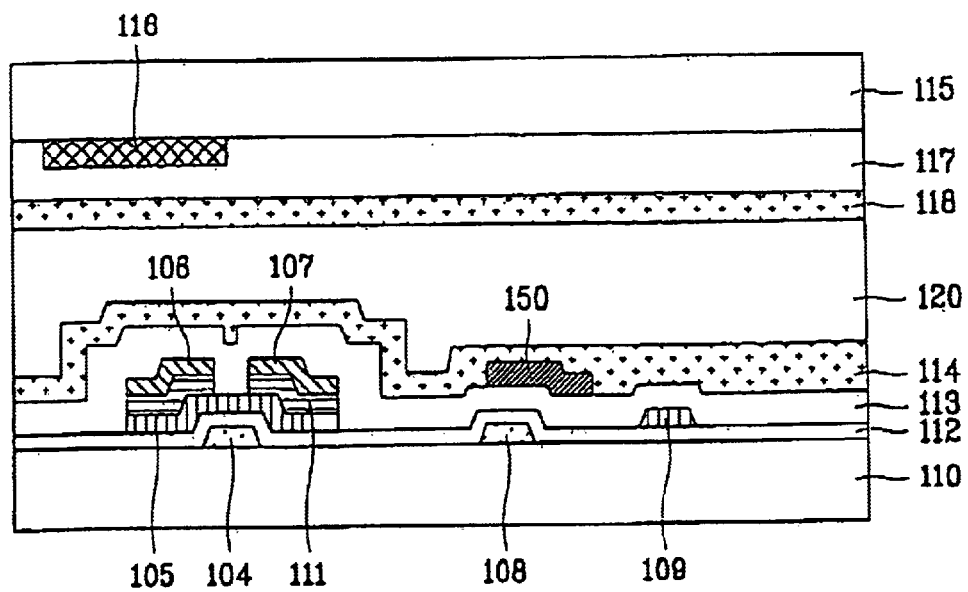
FIG. 5 illustrates a section across B–B' in FIG. 4.

Referring to FIGS. 4 and 5, the in-plane switching mode LCD in accordance with a preferred embodiment of the present invention includes a first substrate 110 having a gate line 101 and a data line 102 running in a horizontal direction and in a vertical direction, respectively, which define a pixel region. Although there are "n" number of gate lines and "m" number of data lines in an actual LCD, defining "n×m" pixels, only one pixel is shown in the drawing for convenience of description. There is a common line 103 in parallel with the gate line 101 in the pixel, and a thin film transistor at the intersection of the gate line 101 and the data line 102. A gate electrode 104 of the thin film transistor is in contact with the gate line 101 and a source electrode 106 is in contact with the data line 102. The data electrode 109 and the common electrode 108 in the pixel are parallel to the data line 102. The common electrode 108 in the pixel region, which is preferably formed on the first substrate 110 at the same time as the gate electrode 104, is parallel with the gate electrode 104 and is connected to the common line 103. The data electrode 109 formed on the gate insulating film parallel to the common electrode 108 provides an in-plane electric field together with the common electrode 108. The data electrode 109 is parallel to the data line 102 and is connected to the drain electrode 107 through a connector as shown in FIG. 4.

Figure 6:
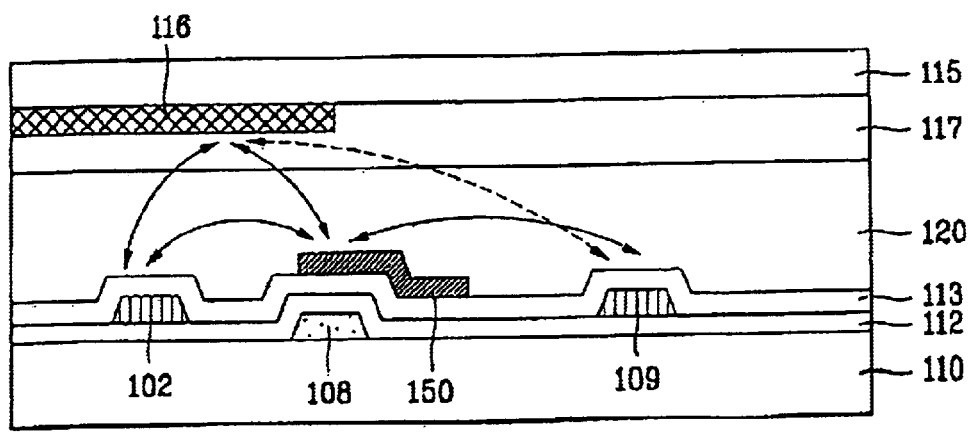
FIG. 6 illustrates electric fields produced in a section of an in-plane switching mode LCD of the present invention.

FIG. 5 illustrates a section across B–B' in FIG. 4. Referring to FIG. 5, the thin film transistor includes a gate electrode 104 on a first substrate 110, a gate insulating film 112 on the gate electrode 104 and the first substrate 110, a semiconductor layer 105 on the gate insulating film 112, and a source electrode 106/a drain electrode 107 on the semiconductor layer. The common electrode 108 is formed on the first substrate 110 preferably at the same time as the gate electrode 104 and is parallel with the gate electrode 104. Although not shown in the drawing, the gate line 101 and the common line 103 are preferably formed at the same time as the gate electrode 104 and the common electrode 108. The common electrode 108 may be formed of ITO, a transparent conductive film. In order to enhance an insulating property of the gate electrode 104, the gate electrode 104 may be oxidized to form an anodized film. Then, the gate insulating film 112 is formed on an entire surface of the substrate 110, and the source electrode 106, the drain electrode 107, and the data electrode 109 are formed thereon. As shown in FIG. 6, the data line 102 is also formed at the same time as the formation of the data electrode 109. The gate electrode 104 of the thin film transistor is connected to the gate line 101. The source electrode 106 is connected to the data line 102. The drain electrode 107 is connected to the data line electrode 109. The data electrode 109 may be formed of ITO instead of a metal such as Cr. There is a protection film 113 on the thin film transistor, the data electrode 109, and the gate insulating film 112.

An electrode 150 is formed over the common electrode 108 as shown in FIGS. 5 and 6. The electrode is a conductive material such as indium tin oxide (ITO) and is preferably formed in an asymmetric shape. Other conductive materials and shapes are contemplated by the present invention. A first orientation film 114 is formed by coating polyimide or a photoreactive material on the common electrode 108 and the protection film 113. Although the orientation film 114 of polyimide has an orientation direction by mechanical rubbing, the orientation film 114 of a photoreactive material including PVCN (polyvinylcinnemate) group material, polysiloxane group material, and cellulose group material has an orientation direction by exposing the photoreactive material to light, such as a UV ray.

A black matrix 116 is formed by forming and etching a metal, such as Cr or CrOx, on the second substrate 115. The black matrix prevents leakage of light toward the TFT, the gate line 101, the data line 102, for example. In addition, the black matrix 116 is a shielding electrode or shielding layer. The shielding layer causes a tilted electric field, together with the common electrode and the data electrode. A color filter layer 117 is formed on the second substrate 115. The color filter layer 117 in each pixel region has R, G, and B, continuously. An overcoat layer (not shown) may be formed on the color filter layer 117 for eliminating an uneven surface of the color filter layer 117 and improving a flatness of the surface. As with the first substrate 110, polyimide or photoreactive material is coated on the color filter layer 117 to form the second orientation film 118. Liquid crystal is interposed between the first substrate 110 and the second substrate 115 to form a liquid crystal layer 120. A transparent conductive film, such as ITO, is formed outside of the second substrate 115 for preventing or guarding against electrostatic discharge. The transparent conductive film may be formed before or after the formation of the color filter layer.

Referring to FIG. 6, the foregoing in-plane switching mode LCD of the present invention facilitates production of a strong electric field in the liquid crystal layer 120. The formation of transparent electrode 150 on the protection film 113 over the common electrode 108 having an asymmetric shape with respect to the common electrode 108 prevents the electric field from being absorbed by the insulating film 112. Thus, the driving voltage required to produce the electric field is reduced. In general, an electric field is formed between the data line 102 and the data electrode 109 when a voltage is applied to the data line 102 by an external driving circuit. This electric field affects molecules of the liquid crystal in the pixel region to cause vertical crosstalk on the display. Providing as much distance as possible between the pixel region and the data line 102 assists in preventing such crosstalk. However, the increased distance affects the aperture ratio of the LCD panel. As shown FIG. 6, the electric field between the black matrix 116 and the data electrode 109 is a weak electric field (a dotted line).

In the in-plane switching mode liquid crystal display of the present invention, the transparent electrode 150 overlaps a top portion of an outermost portion of the common electrode 108 so that a first portion of the transparent electrode is at a first height and a second portion is at a second height, i.e., the ITO electrode 150 is asymmetrical across the protection film 113. The transparent electrode 150 of the present invention shields the electric field extended from the data line 102 to the data electrode 109, thereby preventing crosstalk. The shielding of the electric field by the transparent electrode also results in a substantial reduction in the increase of the transmission through the two outermost windows shown in the related art in-plane switching mode LCD, which is an indication of an enhancement of a data signal shielding effect.

Also, other embodiment of the present invention, the transparent electrode may be on the gate insulating film below the protection film.

Accordingly, an in-plane switching mode liquid crystal display having improved aperture ratio and viewing angle and high picture quality can be fabricated.

As has been explained, the in-plane switching mode liquid crystal display of the present invention increases electric field efficiency and decreases the driving voltage required for switching liquid crystal molecules. Such effects result from a conductive material such as an ITO electrode being formed on the protection film over the common electrode without contacting the common electrode. This prevents the electric field from being absorbed by the protection film and the gate insulating film. As the ITO pattern is shifted to the right side, the in-plane switching mode LCD of the present invention prevents field distortion caused by a Cr black matrix and enhances the data signal shielding effect while minimizing the decrease in luminance provides higher brightness. As a result, vertical crosstalk caused by the data signal is reduced, thereby obtaining a better picture quality. The use of a Cr black matrix in an IPS mode LCD, which has a better production yield than the resin black matrix, permits better yield of the color filter.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display (LCD), comprising:
   a first substrate having a switching element;
   gate lines and data lines on the first substrate;
   a second substrate;
   a first electrode and a second electrode on the first substrate;
   a common line in parallel to the gate lines and connected to the first electrode;
   a transparent electrode asymmetrically overlapping a portion of the first electrode, the transparent electrode preventing vertical crosstalk caused by the data lines and the second electrode; and
   a liquid crystal layer between the first substrate and the second substrate.

2. The in-plane switching mode LCD as claimed in claim 1, wherein the first electrode is a common electrode and the second electrode is a data electrode.

3. The in-plane switching mode LCD as claimed in claim 1, wherein the switching element is a transistor including:
   a gate electrode on the first substrate;
   a gate insulating layer on the gate electrode and the first substrate;
   a semiconductor layer on the gate insulating layer; and
   source and drain electrodes on the semiconductor layer.

4. The in-plane switching mode LCD as claimed in claim 1, wherein the switching element is a transistor including a gate electrode, a source electrode and a drain electrode.

5. The in-plane switching mode LCD as claimed in claim 4, wherein the transistor includes a gate insulating film on the first substrate and the first electrode, the second electrode being formed on the gate insulating film.

6. The in-plane switching mode LCD as claimed in claim 5, wherein the gate insulating film is formed on the gate electrode and the gate electrode is on the same layer as the first electrode.

7. The in-plane switching mode LCD as claimed in claim 1, further comprising a protection film between the transparent electrode and the second electrode and wherein the first electrode, the second electrode and the transparent electrode are all on different layers.

8. The in-plane switching mode LCD as claimed in claim 1, further comprising a shielding electrode on the second substrate, the first and second electrodes and the shielding electrode forming a tilted electric field.

9. The in-plane switching mode LCD as claimed in claim 8, wherein the shielding electrode is a black matrix.

10. The in-plane switching mode LCD as claimed in claim 8, wherein the shielding electrode includes chrome(Cr).

11. The in-plane switching mode LCD as claimed in claim 1, wherein the transparent electrode shields an electric field between the second electrode and the data line.

12. The in-plane switching mode LCD as claimed in claim 1, wherein the transparent electrode includes ITO.

13. The in-plane switching mode LCD as claimed in claim 1, wherein the first electrode has an outmost portion and the transparent electrode is asymmetrical with respect to the outermost portion of the first electrode.

14. An in-plane switching mode liquid crystal display comprising:
a first substrate having a switching element;
gate lines and data lines on the first substrate;
a second substrate;
a plurality of first electrodes including an outermost first electrode on the first substrate;
a common line in parallel to the gate lines and connected to the plurality of first electrodes;
a plurality of second electrodes on the first substrate;
a gate insulating film, a protection film, and a transparent film sequentially stacked on the outermost first electrode, wherein the transparent film at least partially covers the outermost first electrode and prevents vertical crosstalk caused by the data lines and the plurality of second electrodes; and
a liquid crystal layer between the first substrate and the second substrate.

15. The in-plane switching mode LCD as claimed in claim 14, wherein the first electrodes and the second electrodes are on planes different from each other.

16. The in-plane switching mode LCD as claimed in claim 15, wherein the second electrodes are on the gate insulating film.

17. The in-plane switching mode LCD as claimed in claim 14, wherein the transparent film includes indium tin oxide (ITO).

18. The in-plane switching mode LCD as claimed in claim 14, further comprising a shielding electrode on the second substrate, wherein the shielding electrode forms a tilted electric field together with the first and second electrodes.

19. The in-plane switching mode LCD as claimed in claim 14, wherein the transparent film shields an electric field between the second electrode and the data line.

20. An in-plane switching mode liquid crystal display device comprising:
a first substrate having a switching element;
gate lines and data lines on the first substrate;
a second substrate;
a first electrode on the first substrate;
a common lines in parallel to the gate lines and connected to the first electrode;
a gate insulating film on an entire surface of the first substrate including the first electrode;
a second electrode on the gate insulating film, the second electrode forming an in-plane electric field together with the first electrode;
a protection film on the first electrode and the second electrode;
an asymmetric transparent electrode on the protection film and overlapping a portion of the first electrode, the transparent electrode preventing vertical crosstalk caused by the data lines and the second electrode; and
a liquid crystal layer between the first substrate and the second substrate.

21. The in-plane switching mode liquid crystal display device as claimed in claim 20, further comprising a shielding electrode on the second substrate, wherein the shielding electrode forms a tilted electric field together with the first electrode and the second electrode.

22. The in-plane switching mode liquid crystal display device as claimed in claim 21, wherein the shielding electrode is a black matrix.

23. The in-plane switching mode liquid crystal display device as claimed in claim 21, wherein the black matrix is a Cr.

24. The in-plane switching mode liquid crystal display device as claimed in claim 20, wherein the first electrode is a common electrode and the second electrode is a data electrode.

25. The in-plane switching mode liquid crystal display device as claimed in claim 20, wherein the transparent electrode includes indium tin oxide (ITO).

26. The in-plane switching mode liquid crystal display device as claimed in claim 20, wherein the common electrode has an outmost portion and the transparent electrode is on top of the outermost portion of the common electrode, the transparent electrode is asymmetrical.

27. An in-plane switching liquid crystal display (LCD) device comprising:
a first substrate and a second substrate;
gate lines and data lines on the first substrate;
a thin film transistor having a gate electrode, a source electrode and a drain electrode on the first substrate;
a liquid crystal material between the first and second substrate;
a common electrode on a first portion of the first substrate;
a common line in parallel to the gate lines and connected to the common electrode;
a data electrode on a second portion of the first substrate; and
a transparent electrode overlapping a region of the first substrate, the region including at least a portion of the common electrode, the transparent electrode preventing vertical crosstalk caused by the data lines and the data electrode,
wherein the transparent electrode has a first part at a first height above the first substrate and a second part at a second height above the first substrate.

28. The in-plane switching liquid crystal display device of claim 27, wherein the first part overlaps the common electrode and the second height does not overlap the common electrode.

29. The in-plane switching liquid crystal display device of claim 28, wherein the first part of the transparent electrode is higher than the second part of the transparent electrode.

30. The in-plane switching liquid crystal display device of claim 27, further comprising a shielding electrode on the second substrate.

31. The in-plane switching liquid crystal display device of claim 30, wherein the shielding electrode is a black matrix.

32. The in-plane switching mode liquid crystal display as claimed in claim 31, wherein the black matrix is a Cr.

33. The in-plane switching mode liquid crystal display device as claimed in claim 27, wherein the transparent electrode includes indium tin oxide (ITO).

34. The in-plane switching mode liquid crystal display as claimed in claim 27, further comprising a protection film over the first substrate, including the common and data electrodes, the protection film being between the common electrode and the transparent electrode.

35. An in-plane switching liquid crystal display (LCD) device comprising:
  a first substrate;
  a second substrate;
  a thin film transistor including:
    a gate electrode on the first substrate;
    a gate insulating layer on the gate electrode;
    a semiconductor layer on the gate insulating layer; and
    a source electrode and a drain electrode on the semiconductor layer;
  a gate line connected to the gate electrode extending in a first direction;
  a data line connected to one of the source and drain electrodes extending in a second direction, the gate line and the data line defining a pixel region;
  a common electrode on the first substrate on the same layer as the gate line and gate electrode and spaced from the gate electrode;
  a common line in parallel to the gate lines and connected to the common electrode;
  a data electrode connected to one of the source and drain electrodes on the gate insulating film and spaced from the common electrode;
  a protection film on the thin film transistor;
  a field distorting electrode on the protection film overlapping at least a portion of the common electrode, the field distorting electrode preventing vertical crosstalk caused by the data line and the data electrode;
  a black matrix on the second substrate; and
  a liquid crystal material between the first and second orientation film,
  wherein the field distorting electrode includes first and second portions.

36. The in-plane switching liquid crystal display device as claimed in claim 35, wherein the first portion overlaps the common electrode and the second portion does not overlap the common electrode.

37. The in-plane switching liquid crystal display device as claimed in claim 35, wherein the first portion is above the second portion.

38. The in-plane switching liquid crystal display device as claimed in claim 35, wherein the field-distorting electrode includes a transparent conductive material.

39. The in-plane switching liquid crystal display device as claimed in claim 38, wherein the transparent conductive material includes indium tin oxide.

40. The in-plane switching liquid crystal display device as claimed in claim 35, wherein the field distorting electrode forms an electric field with the data line, the data electrode and the black matrix.

41. The in-plane switching liquid crystal display device as claimed in claim 35, wherein the protection film covers the common electrode and the data electrode.

42. The in-plane switching liquid crystal display device as claimed in claim 35, further comprising a first orientation film on the protection film and the field distorting electrode.

43. The in-plane switching liquid crystal display device as claimed in claim 42, further comprising:
  a color filter layer on the second substrate; and
  a second orientation film on the color filter layer.

44. The in-plane switching liquid crystal display device as claimed in claim 42, further comprising an overcoat layer between the color filter layer and the second orientation film.

45. The in-plane switching liquid crystal display device as claimed in claim 35, the field distorting electrode shields an electric field between the data line and the data electrode.

46. A method of manufacturing an in-plane switching liquid crystal display (LCD) device comprising:
  forming a thin film transistor including:
    forming a gate electrode on a first substrate;
    forming a gate insulating layer on the gate electrode;
    forming a semiconductor layer on the gate insulating layer; and
    forming a source electrode and a drain electrode on the semiconductor layer;
  forming a gate line connected to the gate electrode extending in a first direction;
  forming a data line connected to one of the source and drain electrodes extending in a second direction, the gate line and the data line defining a pixel region;
  forming a common electrode on the first substrate on the same layer as the gate line and gate electrode and spaced from the gate electrode;
  forming a common line in parallel with the gate lines and connected to the common electrode;
  forming a data electrode connected to one of the source and drain electrodes on the gate insulating film and spaced from the common electrode;
  forming a protection film on the thin film transistor, the common electrode and the data electrode;
  forming a field distorting electrode on the protection film overlapping at least a portion of the common electrode, the field distorting electrode preventing vertical crosstalk caused by the data line and the data electrode; and
  forming a first orientation film on the protection film and the field-distorting electrode,
  wherein the field distorting electrode includes first and second portions.

47. The method as claimed in claim 46, further comprising:
  forming a black matrix on a second substrate;
  forming a color filter layer on the second substrate;
  forming a second orientation film on the color filter layer; and
  forming a liquid crystal material between the first and second orientation films.

48. The method as claimed in claim 46, wherein the first portion overlaps the common electrode and the second portion does not overlap the common electrode.

49. The method as claimed in claim 46, wherein the first portion is above the second portion.

50. The method as claimed in clam 46, wherein the field-distorting electrode includes a transparent conductive material.

51. The method as claimed in claim 49, wherein the transparent conductive material includes indium tin oxide.

52. The method as claimed in claim 46, wherein the field distorting electrode forms an electric field with the data line, the data electrode and the black matrix.

53. The method as claimed in claim 46, wherein the field distorting electrode shields an electric field between the data line and the data electrode.

* * * * *